United States Patent [19]

Schleiermacher

[11] 4,233,854
[45] Nov. 18, 1980

[54] MOUNTING ARRANGEMENT FOR MOUNTING A PISTON COMPRESSOR ATTACHED AS AN AUXILIARY MACHINE TO AN INTERNAL COMBUSTION ENGINE

[75] Inventor: Herbert Schleiermacher, Brühl, Fed. Rep. of Germany

[73] Assignee: Klöckner-Humboldt-Deutz Aktiengesellschaft, Cologne, Fed. Rep. of Germany

[21] Appl. No.: 42,880

[22] Filed: May 29, 1979

[30] Foreign Application Priority Data

Jun. 1, 1978 [DE] Fed. Rep. of Germany ....... 2823992

[51] Int. Cl.³ ............................................. F03B 11/02
[52] U.S. Cl. .................................. 74/325; 74/606 R; 403/4; 403/337
[58] Field of Search ..................... 248/637, 664; 74/44, 74/325, 397, 380, 600 R; 92/146, 161, 128, 172; 417/238; 403/4, 335, 337

[56] References Cited

U.S. PATENT DOCUMENTS

| 1,964,679 | 6/1934 | Springfield | 417/238 |
| 2,452,232 | 10/1948 | Fischer | 74/44 |
| 2,572,711 | 10/1951 | Fischer | 417/238 |
| 2,594,404 | 4/1952 | Debrie | 248/664 X |

Primary Examiner—C. J. Husar
Assistant Examiner—Conrad Berman
Attorney, Agent, or Firm—Becker & Becker, Inc.

[57] ABSTRACT

A mounting arrangement for mounting a piston compressor attached as an auxiliary machine to an internal combustion engine which piston compressor has an open crank assembly and a gear wheel on an extended crankshaft for installation in, and cooperation with, the gear transmission system of the internal combustion engine and a mounting flange surface portion below the cylinder. Between the flange surface portion of the piston compressor and the transmission housing for the internal combustion engine there is provided an intermediate flange member the flange face of which is directed towards the transmission housing, is axis-parallel to the crank circle cylindrically arched, and is attachable to be radially movable in the circumferential direction of the arcuate portion on a matching concave surface portion of the transmission housing.

6 Claims, 2 Drawing Figures

MOUNTING ARRANGEMENT FOR MOUNTING A PISTON COMPRESSOR ATTACHED AS AN AUXILIARY MACHINE TO AN INTERNAL COMBUSTION ENGINE

The present invention relates to a mounting arrangement for a piston compressor attached as an auxiliary machine to an internal combustion engine, the piston compressor having an open crank assembly, a gear wheel on the extended crankshaft for installation in, and cooperation with, the gear transmission system of the internal combustion engine, and a mounting flange surface portion below the cylinder of the compressor.

In internal combustion engines which are produced in large series or quantities, for the pertaining use of an engine there arise varying performance requirements and revolutions (rpm). For example, when using an engine in a tractor or similar agricultural vehicle, a lower number of revolutions is required in comparison with an engine intended for a truck or similar commercial vehicle. In both cases, however, the attachment of a piston compressor as an auxiliary machine for the production of compressed air can be necessary. When using the same compressor, attachment thereof to an internal combustion engine intended for operation at the lower maximum number of revolutions provides for attainment of a lower performance or output, in comparison with attachment to an otherwise identical internal combustion engine which is intended to operate at a higher maximum number of revolutions. However, since in both those assembly situations the same compressed air assembly is present, e.g. for brakes or other similar devices, in the one case an insufficient amount of compressed air is provided. Thus, there exists the need to provide a compressor with an increased performance or output per unit of time for an internal combustion engine intended to operate at lower maximum number of revolutions. Accordingly, various compressors have to be kept in stock for differing selected maximum number of revolutions for internal combustion engines. It is customary to vary in piston compressors which are externally attached or mounted on the internal combustion engine and which are driven by means of V-belts, the transmission ratio at different drive maximum number of revolutions by varying the diameter of the V-belt pulley. However, the considerable wear of the V-belts is of detriment for piston compressors which are driven by such V-belts. This wear, for one, occurs due to the intermittent operation of such piston compressors which receive a high starting torque in the case of connecting-on during an operating phase of the internal combustion engine having a low number of revolutions, which leads to increased slipping and wear of the V-belts.

It is an object of the invention to provide a compressor drive which is very resistant to wear and which can be adapted with simple means at differing maximum drive number of revolutions to these, so that the maximum drive number of revolutions also corresponds to the highest permissible number of revolutions of the compressor.

This object and other objects and advantages of the invention will appear more clearly from the following specification in connection with the accompanying drawings, in which.

The mounting arrangement for the piston compressor according to the invention is characterized primarily in that between the flange surface portion of the compressor and the transmission housing for the internal combustion engine there is provided an intermediate flange member the flange face of which is directed towards the transmission housing, is axis-parallel to the crank circle cylindrically arched, and is attachable or mountable to be radially movable in the circumferential direction of the arcuate portion on a matching concave surface portion of the transmission housing.

Such an attaching arrangement or mounting arrangement permits swinging movement of the compressor through a predetermined range and engagement by the intervention of a gear wheel with the control transmission of the internal combustion engine. Simultaneously, the edge-contact of mesh of the meshing gears is adjustable to a low noise level. The range of swinging or pivotal movement is selected in size in a manner that gear wheels of different diameter can be installed, whereby the transmission ratio and, in turn, the number of revolutions of the piston compressor can be varied.

In order that the mounting screws do not interfere with the pivotal or swinging movement of the piston compressor and the intermediate flange member, it is proposed that the through-bores in the mounting flange of the compressor and in the intermediate flange member are in the form of slotted holes.

For compensation of the changing attitude of the supporting surfaces of the screws which come to an inclined position on pivotal or swinging movement of the compressor, it is proposed that the mounting screws for the compressor, respectively, act through the intervention of a spherical washer and ball cup or socket on the support surface of said compressor.

The supply of lubricating oil for the movable compressor components, in accordance with another embodiment of the invention, is provided in a manner that the means for effecting lubrication of such compressor components are connected to the lubricating oil circuit for the pertaining internal combustion engine. Return of the lubricating oil is carried out in a simple manner by passing it through the housing of the transmission which is in communication with the oil pan of the internal combustion engine.

In order to permit changing of the transmission ratio between the internal combustion engine and the piston compressor, it is proposed, according to yet another embodiment of the invention, that the driving gear wheel of the compressor is interchangeable by other gear wheels, with either a smaller or greater number of gear teeth.

Figure 1:
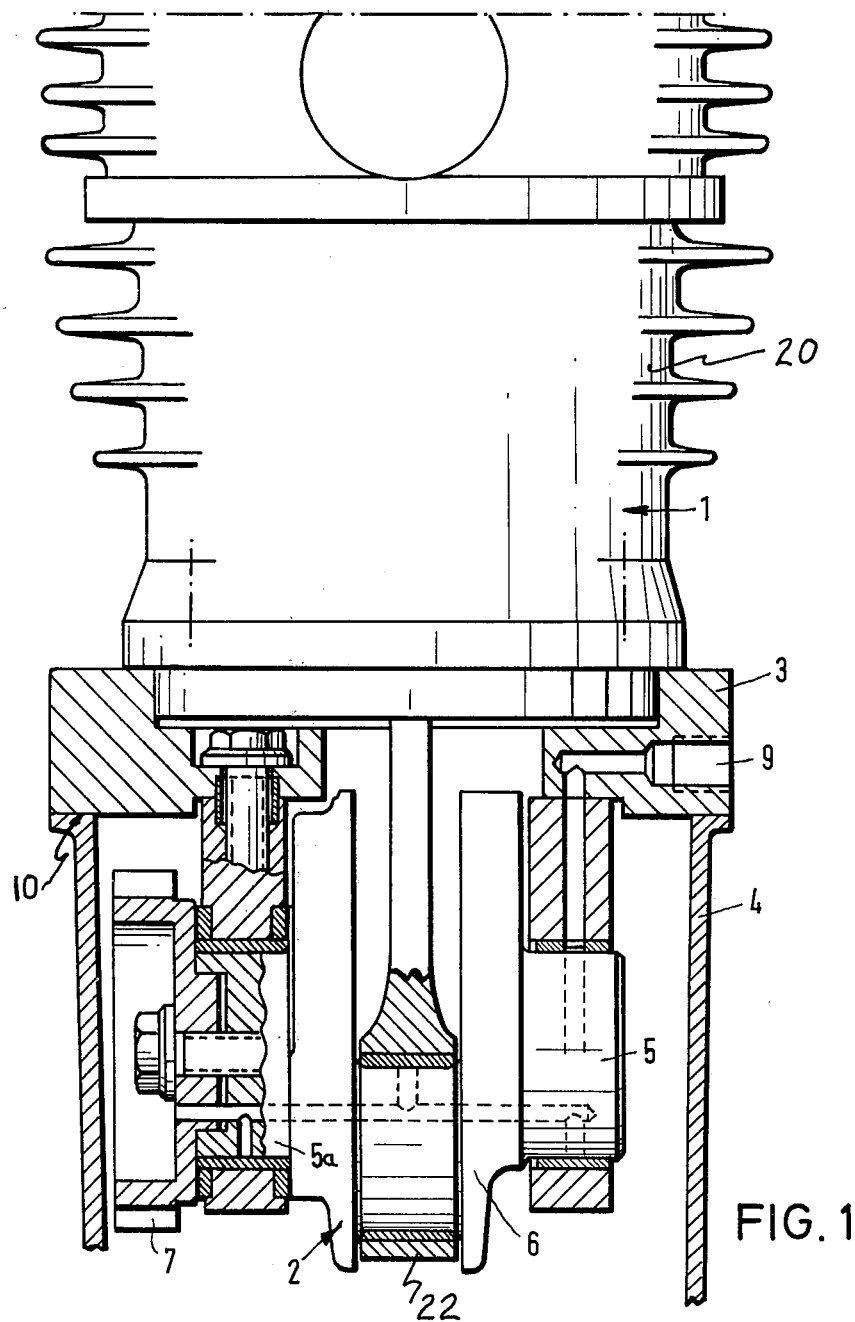
FIG. 1 shows a front elevational view, partially in section, of a piston compressor with an open crank assembly which is flange-mounted on the housing of a control transmission means for an internal combustion engine and which includes a gear wheel which is operatively engageable with the control transmission system.
Figure 2:
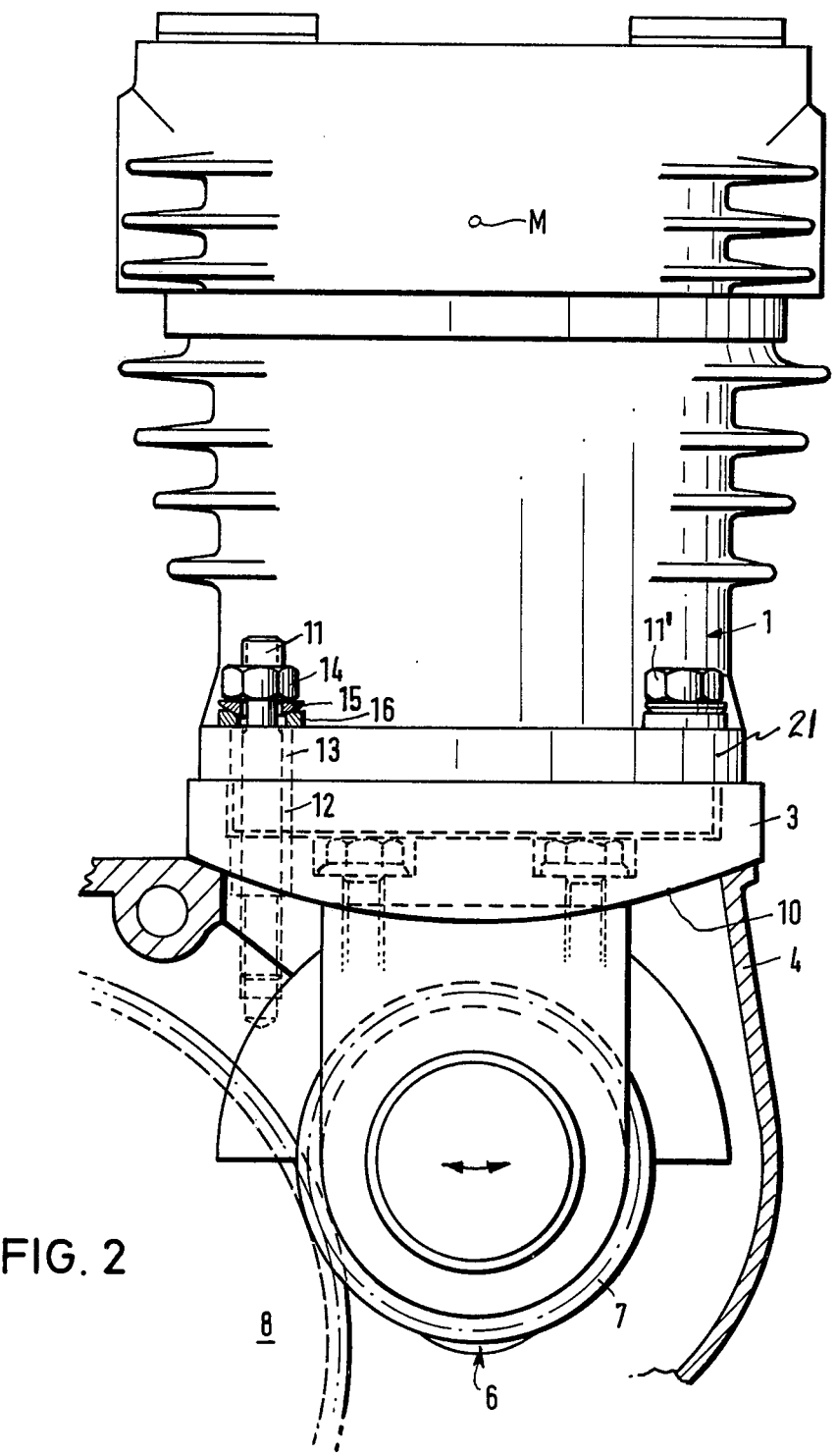
FIG. 2 shows a side elevational view of the embodiment according to FIG. 1.

Referring now particularly to the drawings, FIG. 1 shows a piston compressor generally denoted by the numeral 1 having an open crank assembly generally indicated by the numeral 2, which assembly includes a connecting rod 22, a crankshaft 6 with crankshaft journal or bearing trunions or pins 5 and 5a, and a piston, not shown, which is reciprocatingly movable in the cylinder or piston housing 20. The piston compressor 1 is flange-mounted with its flange portion 21 (FIG. 2) by the intervention of an intermediate flange member 3 on the housing 4 of a control transmission means, not shown, for the internal combustion engine. The crankshaft pin 5a, which may be extended in length for this purpose, receives thereon a gear wheel 7 which is adapted to be operatively engageable with the camshaft gear wheel 8 (FIG. 2). Lubrication of the movable components of the piston compressor is carried out by means of a conduit system, not shown, which is connectible to the threaded bore 9 (FIG. 1), the required amount of lubricating oil being taken from the supply of lubricating oil for the internal combustion engine.

The piston compressor 1 and the transmission housing 4 for the internal combustion engine are shown in FIG. 2 in the direction of the end face towards the crank assembly 2. The intermediate flange member 3, in accordance with the present invention, has a cylindrically arched flange surface portion 10 which is fitted in a matching arcuate or concave flange surface portion of the housing 4 for the control transmission. The center point "M" of the cylindrically arched flange surface 10 is on the longitudinal axis of the piston compressor. The piston compressor 1 can be pivoted or swung about this point "M" so that the gear wheel 7 is more or less in operative engagement with the camshaft gear wheel 8. The edge-contact of mesh of the teeth is thereby adjustable. The pivotal or swinging movement of the gear wheel 7 in counterclockwise direction will cause an increase of the distance between the centers of gear wheels 7 and 8 so that, as required, also a larger gear wheel can be used.

When housing-fast fasteners are used, i.e. fasteners such as threaded pins 11 or screws 11', slotted holes 12 and 13 are provided, respectively, in the intermediate flange member 3 and the flange portion 21, whereby the length of each slot provides for a range of adjustments of the piston compressor 1. So that the pertaining nut 14 or the screw head of a fastener such as screw 11' is seated on a generally planar support surface, when the piston compressor 1 has been swung as mentioned above, for each pertaining fastener, there is provided a spherical washer 15 and a ball cup or socket 16. Examples for such washers and ball sockets are shown in German Industrial Standard DIN 6319.

The present invention is, of course, in no way restricted to the specific disclosure of the specification and drawings, but also encompasses any modifications within the scope of the appended claims.

What I claim is:

1. A mounting arrangement for mounting a piston compressor to be operatively associated as an auxiliary machine of an internal combustion engine which includes a transmission system and a housing for said transmission system, said piston compressor including an open crank assembly with an extended crankshaft for a gear wheel engageable with a gear of said transmission system, and a mounting flange surface portion, said mounting arrangement comprising:

an intermediate flange member arranged between said mounting flange surface portion and said housing for said transmission system, said intermediate flange member having a flange surface which is directed towards said housing and is axis-parallel with and cylindrically arched toward said gear wheel; and a matching concave surface portion on said housing, whereby said intermediate flange member is radially movable in the circumferential direction of said flange surface of said intermediate flange member.

2. A mounting arrangement according to claim 1, wherein at least said mounting flange surface portion of said piston compressor includes slot-like through-bores.

3. A mounting arrangement according to claim 1, wherein said intermediate flange member includes slot-like through-bores.

4. A mounting arrangement according to claim 1, and further comprising threaded fastener means for securement of said piston compressor, and spherical washer and ball socket means on said mounting flange surface portion for provision of a planar surface for maintaining threaded fastener means of said piston compressor.

5. A mounting arrangement according to claim 1, which includes lubrication means for lubricating movable components of said piston compressor, said lubricating means being connected with the lubrication circuit of said internal combustion engine.

6. A mounting arrangement according to claim 1, wherein said gear wheel is interchangeable with gear wheels having different diameters and numbers of teeth.

* * * * *